United States Patent [19]
Walker et al.

[11] Patent Number: 5,970,470
[45] Date of Patent: Oct. 19, 1999

[54] SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES

[75] Inventors: Jay S. Walker, Ridgefield; James A. Jorasch, Stamford; Andrew S. VanLuchene, Norwalk, all of Conn.

[73] Assignee: Walker Asset Management Limited Partnership, Stamford, Conn.

[21] Appl. No.: 08/889,589

[22] Filed: Jul. 8, 1997

[51] Int. Cl.[6] .................................................. G06F 17/60
[52] U.S. Cl. ................................. 705/14; 705/20
[58] Field of Search .................. 705/14, 16, 17, 705/20, 21, 23, 24, 35; 235/449, 375, 487

[56] References Cited

U.S. PATENT DOCUMENTS

| | | | |
|---|---|---|---|
| 4,554,446 | 11/1985 | Murphy et al. | 235/487 |
| 4,723,212 | 2/1988 | Mindrum et al. | 705/14 |
| 4,910,672 | 3/1990 | Off et al. | 705/74 |
| 5,056,019 | 10/1991 | Schultz et al. | 705/14 |
| 5,173,851 | 12/1992 | Off et al. | 705/14 |
| 5,256,863 | 10/1993 | Ferguson et al. | 380/24 |
| 5,321,243 | 6/1994 | Groves et al. | 235/449 |
| 5,331,544 | 7/1994 | Lu et al. | 705/10 |
| 5,434,394 | 7/1995 | Roach et al. | 235/375 |
| 5,621,812 | 4/1997 | Deaton et al. | 382/100 |
| 5,717,989 | 2/1998 | Tozzoli et al. | 705/37 |
| 5,758,328 | 5/1998 | Giovannoli | 705/26 |

OTHER PUBLICATIONS

Dialog Abstract: File 15, Acc#00545621; Leibson; "Buying Contracts Deliver the Goods, and Hefty Discounts Too"; Facilities Design & Managment; v10 n4; pp. 54–57, Apr. 199.

Dialog Abstract; File 256, Acc#01567035; CA–MANMAN/X:Purchase Contracts; Computer Associates International Inc, Jan. 1992.

Tinnelly; "The Custom Switch Isn't a Rare Choice Anymore—Benefits Outweigh Added Costs, Makers Say"; Electronic Buyers' News; n 897; Dialog: File 647, Acc#001016918, 1994.

Primary Examiner—Stephen R. Tkacs
Attorney, Agent, or Firm—Jeffrey L. Brandt; Dean Alderucci

[57] ABSTRACT

A system and process for distributing a product in accordance with a subscription purchase agreement that includes the establishment by a customer of an account with a seller of a product, the assignment of a customer identification number to the account maintained by a customer, the receipt of a credit card number corresponding to the customer, and the receipt of a request from the customer to purchase the product from the seller. The request includes a set of purchase terms and conditions related to the product. Also, the set of purchase terms and conditions are recorded for the customer. The set of purchase terms and conditions indicate a purchase price for the product. A customer's credit card or other account may be assessed a penalty in the event that the customer does not honor the purchase terms and conditions.

115 Claims, 11 Drawing Sheets

| FREQUENT SHOPPER ID NUMBER | ITEM CODE | CREDIT CARD NUMBER | SUBSCRIPTION START DATE | SUBSCRIPTION END DATE | NUMBER OF UNITS PURCHASED TO DATE | UNIT PRICE |
|---|---|---|---|---|---|---|
| 123456789 | 456789 | 1111-1111-1111-1111 | 2/1/97 | 2/1/98 | 38 | $1.29 |
| 123456789 | 454679 | 1111-1111-1111-1111 | 2/1/97 | 2/1/98 | 2 | $1.89 |
| 123456790 | 456795 | 2222-2222-2222-2222 | 10/2/97 | 1/02/98 | 18 | $1.32 |

| SUBSCRIPTION AGREEMENT CODE | ITEM NUMBER | SUBSCRIPTION DURATION | SUBSCRIPTION QUANTITY | UNIT PRICE | PENALTY |
|---|---|---|---|---|---|
| 456789-1023 | 456789 | 1 YEAR | 52 | $1.29 | $25.00 |
| 456789-2024 | 456789 | 6 MONTHS | 15 | $1.89 | $37.00 |
| 456791-3025 | 456791 | 3 MONTHS | 12 | $1.37 | NON-RENEWABLE |
| 456792-4026 | 456792 | 1 YEAR | 26 | $1.39 | FCN: INC DIFF x ACTUAL VOLUME |

| FREQUENT SHOPPER ID | CUSTOMER NAME | CUSTOMER ADDRESS |
|---|---|---|
| 123456789 | BILL SMITH | 111 RED ST. NORWALK, CT 06850 |
| 123456790 | JACK BROWN | 222 GREEN RD. DARIEN, CT 06851 |
| 123456791 | JILL O'RILEY | 333 BLUE DR. STAMFORD, CT 06905 |

SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES

BACKGROUND OF THE INVENTION

1. Field of the Invention

The present invention relates to the field of mass merchandising and, in particular, the sale and distribution of products in accordance with agreements including volume commitments and price guarantees.

2. Description of the Related Art

Over the past two decades, while U.S. gross spending on food and food-related products has grown to over $300 billion dollars per year, the market share of conventional supermarkets and groceries has dwindled significantly below a once controlling interest. In large part, this drop in market share has been caused by competition from bulk purchasing clubs.

Bulk purchasing clubs, or warehouse clubs, have identified and are exploiting a lucrative portion of the food products market; those customers who are willing to make bulk purchases in exchange for discount prices. Such bulk sales have cut directly into the volume of conventional supermarkets and groceries.

With market share steadily eroding, it has become necessary for supermarkets and groceries to attempt to stem the loss of customers to warehouse clubs. Due to the fundamental differences in their businesses, however, it is difficult for a conventional supermarket to compete with a bulk purchasing club.

Bulk purchasing clubs represent a very specialized portion of the food products market. They are able to locate in less expensive areas—often occupying warehouse type facilities—while still attracting customers desirous of discount pricing. They are able to stock a very limited number of products; customers do not expect every product to be available in quantity. They sell larger quantities of product per transaction, thereby realizing lower per-sale costs.

Bulk purchasing clubs are not expected to offer the amenities often provided by supermarkets, such as non-food product goods and services, check-cashing services, and bagging. Further, customers, also known as Ômembers,Ô are often willing to pay a membership fee for the right to belong to the Ôclub.Ô Such fees help offset what are traditionally thin margins.

In contrast, conventional supermarkets and groceries must locate in convenient areas for their customers, thus often realizing higher real estate costs. They must stock a much larger number of products in order to attract customers, and they have relatively higher transaction costs due to the typically large quantity of small items per purchase. To compete in their core business, conventional markets are expected to provide significant customer amenities, without the imposition of any type of service or membership fee.

In addition, supermarkets typically do not have the physical infrastructure necessary to compete in a traditional bulk selling environment. Because they are located in pricier facilities, they often have less floor and shelf space, with all available space being used by the large number of products they stock.

In one attempt to compete with bulk retailers, supermarkets have implemented frequent shopper programs. In a typical frequent shopper program, a customer is provided with a card identifier which is presented at each visit. Records are typically kept of customer purchases, and various discounts and benefits are typically provided to the customer in return for registration and subsequent use of the card.

Frequent shopper programs, however, suffer from relatively limited acceptance by customers. It is not atypical to have less than 25 percent usage of such programs by regular customers, and it is not financially prudent for these programs to provide prices that are competitive with bulk purchasing programs. Overall, frequent shopper programs do not provide a realistic alternative to customers interested in bulk purchasing. In fact, no systems or methods are known to applicants which permit conventional supermarkets to compete effectively against bulk purchasing clubs.

There thus exists a serious need for systems and processes which provide conventional supermarkets and grocery stores with the tools necessary to compete with bulk resellers. Without such systems and processes, their market shares and profitability will continue to decline. To be effective, such programs must provide customers with the same or similar levels of discount prices that strongly motivate bulk purchasing customers, while at the same time accommodating the constraints of the supermarket: that is, permitting the supermarket to continue to compete successfully in their core business.

SUMMARY OF THE INVENTION

It is a principle object of the present invention to provide new and improved systems and methods that facilitate the establishment of commitments for bulk purchases of commodity items with incremental payment and delivery terms.

More specifically, it is an object of the present invention to provide systems and methods that enable food markets to establish commitments for bulk product purchases with customers, the commitments having incremental payment and delivery terms.

It is a further object of the present invention to provide systems and methods that enable food markets to establish such commitments for bulk food product purchases using readily available point-of-sale retail processes and equipment.

In accordance with the present invention, there are provided new and improved systems and methods that enable supermarkets to establish bulk product purchase commitments with customers. More specifically, the invention enables food markets to offer the very desirable benefits of discounted bulk prices along with incremental payment and delivery. The customer thus realizes the benefits of bulk pricing, while, in a preferred embodiment, paying for and collecting his product in useful portion sizes and over a convenient period of time. The invention will thus permit a supermarket to offer a customer the significant discounts associated with bulk purchasing along with the convenience of regular shopping. In accordance with one aspect of the present invention, a system and method are provided for facilitating the sale of an item, the system comprising: a data storage system storing data about a buyer, an agreement between the buyer and a seller including a commitment by the buyer to purchase a specified plurality of an item from the seller over a period of time and at a specified price, and a data processing system coupled to the data storage system and configured to receive from the buyer a request to purchase the item from the seller, to process the request by determining a purchase price for the item based on the specified price in the agreement, to output the purchase price, the purchase price forming the basis of a transaction involving the buyer and the item, and to charge a fee to an account maintained by the buyer if the buyer does not purchase the specified plurality of the item during the period of time.

In accordance with another aspect of the invention, there is provided a method and system for facilitating the sale of an item, the method comprising the steps of: storing in a data storage system a table including data identifying a buyer, data identifying a product, and data identifying an agreement between the buyer and a seller including a commitment by the buyer to purchase a specified plurality of the product from the seller within a specified period of time at a specified purchase price per product; receiving a request to purchase the product including the data identifying the buyer and the data identifying the product; processing in a data processing system the data identifying the buyer and the data identifying the product to identify the specified purchase price in the table; and outputting the specified purchase price.

BRIEF DESCRIPTION OF THE DRAWINGS

The present invention is described in detail below with reference to the following drawing figures of which:

FIG. 3A is an illustration of a database table referred to as the CERTIFICATE database shown in FIG. 2;

FIG. 3B is an illustration of a database table referred to as the AGREEMENT database shown in FIG. 2;

FIG. 3C is an illustration of a database table referred to as the ACCOUNT database shown in FIG. 2;

DETAILED DESCRIPTION OF THE PREFERRED EMBODIMENTS

Figure 1:
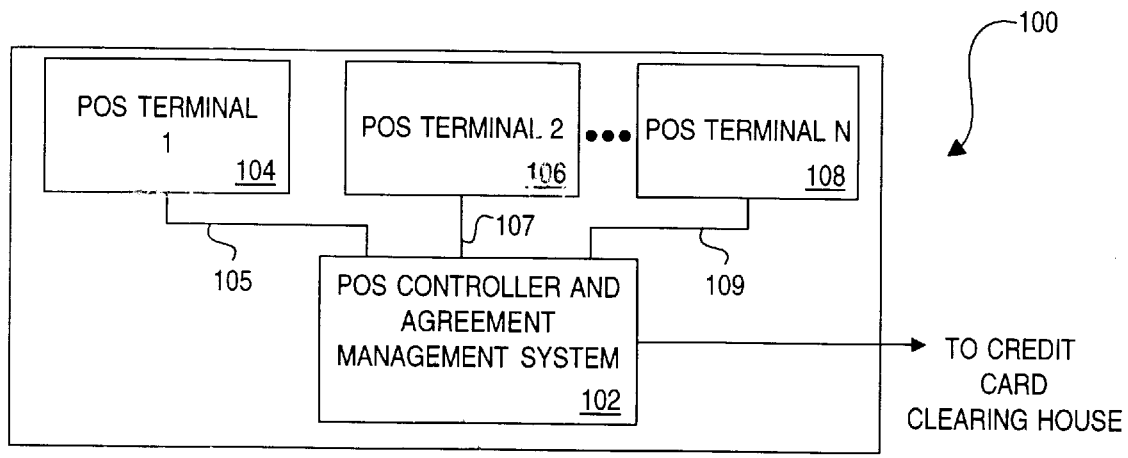
FIG. 1 is a block diagram of a retail establishment according to the prior art.

In this section, the present invention is described in detail with regard to the drawing figures briefly described above.

As such, the following terms are used throughout the remainder of this section. For purposes of construction, such terms shall have the following meanings:

The terms "item", "product", and "service", unless otherwise specified, are intended to refer to any item sold or offered by a retailer. Accordingly, for purposes of construction, the terms "item," "product," or "service" shall be treated as synonyms. An example of a product is a gallon of milk or a dozen roses offered by a grocery store. An example of service may include a set of oil changes or carpet cleanings offered by a warehouse outlet. Additionally, a product may include some form of combination of products that may be purchased together according to specific terms and conditions of a particular purchase agreement.

The terms "store", "retailer", "outlet", "merchant", and "seller", unless otherwise specified, are intended to refer to any retail merchandising establishment that caters to the public and that allows customers to select products and services from retail displays. An example of such a retail merchandising establishment is a grocery store.

The terms "customer", "shopper", and "buyer", unless otherwise specified, are intended to refer to any person, group of people, or other entity that visits or otherwise patronizes a retailer and who purchases products and services from that retailer.

The terms "agreement", "purchase agreement", "subscription agreement", and "volume agreement", unless otherwise specified, are intended to refer to a contract that is formed between a customer and retailer and that contains definite terms and conditions. Terms and conditions are those provisions in an agreement that govern the rights and obligations of the parties (e.g., a promise to purchase a certain quantity of an item can be said to be a "volume commitment"). For example, a customer may agree with a retailer to purchase dozens of roses a certain number of times over a specified period of time and at a specified price. Additionally, such terms and conditions may include a penalty provision whereby if the customer does not fulfill his particular purchase commitment relating to a particular product, then a penalty (e.g., a price adjustment) may be charged to the customer by the retailer.

The aforementioned and defined terms are used below to describe the preferred embodiments of the present invention. Where appropriate, like parts are referred to with like reference numerals.

The following paragraphs illustrate the structural and operational aspects of the present invention. The structural aspects are illustrated first and are followed by discussions of the operational aspects.

In terms of structure, reference is now made to FIG. 1. Therein depicted is a block diagram representing a retail establishment 100 equipped to establish subscription purchase agreements (also referred to herein as "agreements" and "purchase agreements") and to process sales transactions in accordance therewith. Retail establishment 100 maybe a retail store such as a warehouse store, a supermarket or grocery, a department store, or any other retail or merchandising establishment. Retail establishment 100 includes a point of sale (POS) controller and agreement management system 102 (hereinafter "system 102"), a POS terminal 1 (104), a POS terminal 2 (106), and a POS terminal N (108). POS terminal N 108 is intended to indicate that retail establishment 100 may include any number of POS terminals. Each POS terminal is coupled to system 102 via a data link such as data link 105, data link 107, and data link 109.

System 102 is a data processing system such as a computer-equipped automatic data processing system including a central processing unit, a random access memory unit, a read-only memory unit, an input-output unit, and a permanent or semi-permanent data storage unit. The nature of system 102 is discussed in detail below with reference to FIG. 2.

Each POS terminal is configured to process POS transactions such as credit card transactions, debit card transactions, etc. Preferably, each POS terminal is one that is adapted to process credit card transactions and the entry of data via manual operation. POS terminals manufactured by VERIFONE (e.g., the TRANZ Model #460) that enable data entry of credit numbers, transaction amounts, and expiration dates via touch pads or key pads are well suited to the present invention. Such POS terminals will readily understood by those skilled in the art.

Each POS terminal is coupled to system 102 via links 105, 107 and 109, respectively. Links 105, 107 and 109 allow data transfers that include the transmission and reception of credit card account numbers, credit card expiration dates, debit card numbers, transaction amounts, and now, information related to purchase agreements according to the present invention. The nature of such information related to purchase agreements and the like is discussed in detail below.

In any case, a link such as link 105 preferably comprises a network connection and/or a serial connection between POS terminal 104 and system 102. For example, link 105 may be a 10BaseT connection enabling Internet communications between POS terminal 104 and system 102. Of course, many other forms of communication links may be incorporated into the actual implementation of the present invention. Such other data links may include network connections, wireless connections, radio based communications, telephony based communications, and other network-based communications such as via wide area networks distributed via open architectures such as by the Internet.

In FIG. 1, system 102 is configured to communicate with a credit card clearinghouse or other authority enabled to process credit card or other transactions. The linking of system 102 with such a credit card clearinghouse or other authority will be readily apparent to those skilled in the art. For example, system 102 could be coupled to a credit card clearinghouse via telephony links such as dedicated telephone lines and the like.

Figure 2:
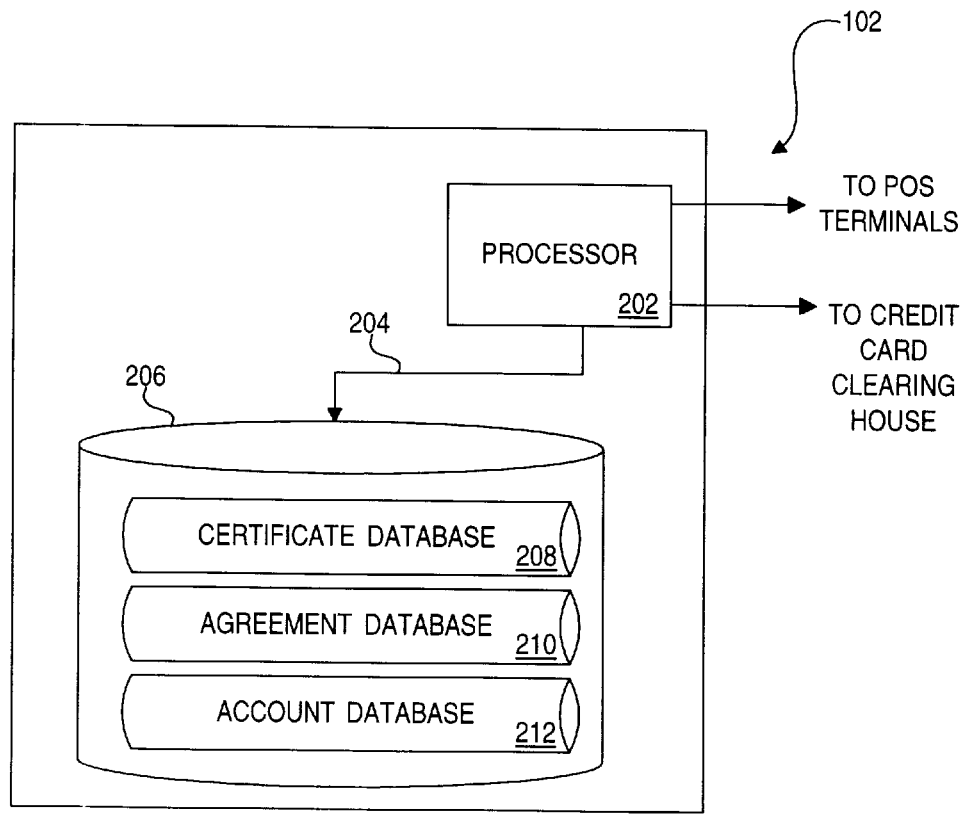
FIG. 2 is a block diagram of a point-of-sale (POS) controller configured in accordance with a preferred embodiment of the present invention.

Referring now to FIG. 2, therein depicted is a block diagram of system 102 as originally depicted in FIG. 1. Accordingly, system 102 includes a processor 202 and a data storage sub-system 206. Processor 202 is coupled to data storage sub-system 206 via a bus 204 or other well-known, high-speed data communications vehicle or channel. Processor 202 is of the typical variety and is preferably one like those manufactured by SUN (e.g., the SUN SPARC 1000 running the SOLARIS operating system). Moreover, processor 202 is a computer system adapted to run software programs.

Additionally, processor 202 is configured with communications equipment such as telephony communications and network communications equipment to communicate with external computer systems such as credit card clearinghouses or other authorities and, as noted above with regard to FIG. 1, with POS terminals such as POS terminals 104 and 106 (FIG. 1).

Data storage sub-system 206 is preferably any form of mass storage device configured to read and write database type data maintained in a file store (e.g., a magnetic disk data storage device). Of course, it will be readily appreciated that data storage sub-system 206 may be one that consist of multiple disk sub-systems which may be geographically dispersed and coupled via a network architecture. There is no positive requirement that data storage subsystem 206 be maintained in one facility; to the contrary, the volume of information stored therein may dictate geographical dispersion and the like. All that is required is that data storage sub-system 206 be logically addressable as a consolidated data source across a distributed environment such across a network system. The implementation of local and wide-area database management systems to achieve the functionality of data storage sub-system 206 will readily understood by those skilled in the art of computer technologies.

As noted above, processor 202 and data storage subsystem 206 are coupled together in a conventional way via communications link 204. Communications link may be a bus or network architecture as indicated above. Communications link 204 is required to be a high speed data transfer medium. As such, communications link 204 will be readily understood by those skilled in the art of computer architecture.

Stored within data storage sub-system 206 are database tables collectively forming a database management system maintained by controller 200. In particular, data storage sub-system 206 houses and maintains a CERTIFICATE DATABASE 208, an AGREEMENT DATABASE 210, and an ACCOUNT DATABASE 212. Such databases are managed and maintained in a relational manner by a database management system software package such as the ORACLE SYSTEM 7 database management system. The creation of such databases and the management and manipulation of the same will be readily understood by those skilled in the art of database management systems and, especially, relational database management systems. The databases stored within data storage sub-system 206 are addressed in detail below in regard to FIGS. 3A, 3B and 3C.

The aforementioned and described systems shown in FIGS. 1 and 2 are merely illustrative of preferred embodiments of systems and components that may be used to carry out the functions and operations of the present invention. Such systems and components should not be interpreted to limit the scope of the present invention. For example, as is described below with regard to FIGS. 3A, 3B, and 3C, the data stored in the databases maintained by processor 202 may change and vary to suit particular implementation details and requirements. Such changes will be readily appreciated by those skilled in the art of computer system design and implementation.

The following paragraphs describe preferred embodiments of the database tables that are used in the present invention to allow users to establish agreements (e.g., subscription agreements) with retail establishments to obtain favorable pricing for products purchased regularly over time. The database tables depicted in FIGS. 3A, 3B, and 3C are intended to be operational in a computerized database management system of a data processing or automatic data processing system adapted to manage table relationships established by common fields and proper table joins and related queries. In particular, a relational database management system is well suited to manage the flow of information within a system such as system 102 (FIG. 1) and the processing of data and the tables illustrated in FIGS. 3A, 3B, and 3C. Preferably, the database management system that is used to manage the database tables illustrated in FIGS. 3A, 3B, AND 3C is one like ORACLE 7 produced by the ORACLE CORPORATION. Of course, many changes and alterations may be made to such tables to effectuate certain functionality depending on particular design and implementation details. Such changes and alterations will be apparent to those skilled in the art of computer programming and database management system design and implementation. Moreover, the use of a database management system such as the ORACLE 7 system will be readily apparent to those skilled in the art of database design and implementation.

In addition to the foregoing comments, certain records in the database tables depicted in FIGS. 3A, 3B, and 3C, have asterisks next to their record identifiers. The asterisks are intended to identify the records among the tables that are related by way of a transaction and are meant to illustrate the benefits associated with the present invention. The records marked with asterisks will also be referenced in the flowcharts depicted in FIGS. 4A, 4B, 5A, 5B, and 6 to clarify the operations carried out by the preferred embodiments of the present invention.

Referring now to FIG. 3A, therein depicted is a database table for storing records related to agreements involving a customer and a particular store that maintains a POS controller system that manages such data. Database table 208 (hereinafter "table 208") is a preferred implementation of CERTIFICATE DATABASE 208 as originally illustrated in FIG. 2. Table 208 has a column and row arrangement whereby columns define fields and rows define records stored according to the field specifications of the columns. In table 208 there are seven columns. Such columns store data related to FREQUENT SHOPPER ID NUMBER, ITEM CODE, CREDIT CARD NUMBER, SUBSCRIPTION START DATE, SUBSCRIPTION END DATE, NUMBER OF UNITS PURCHASED TO DATE, and UNIT PRICE. In table 208, record R1 contains information related to an agreement having terms and conditions indicating a shopper having a FREQUENT SHOPPER ID NUMBER of 123456789 among other specified data. Record R1 has been marked with an asterisk next to its record identifier to indicated that it is related to other records in other tables and will be discussed in detail in the following paragraphs.

The agreement to which record R1 pertains, is a subscription type of agreement whereby FREQUENT SHOPPER NUMBER 123456789 has agreed to buy a particular item such as one having an ITEM CODE of 456789 a particular or specific number of times between Feb. 1, 1997 and Feb. 1, 1998. Shopper 123456789 will be able to acquire the particular item for $1.29 which is intended to be less than the shelf price that the store (e.g., the entity maintaining table 208) normally charges for the specified item.

The column labeled NUMBER OF UNITS PURCHASED TO DATE indicates that shopper number 123456789 has purchase item 456789 thirty-eight times to date. Accordingly, the field in each record labeled NUMBER OF UNITS PURCHASED TO DATE acts as a counter which is incremented (e.g., by one) each time shopper 123456789 purchases item 456789.

It is the agreement to which record R1 pertains that allows shopper number 123456789 to obtain item 456789 at a preferred or desired price of $1.29 throughout the subscription agreement effective period between Feb. 1, 1997 and Feb. 1, 1998. It is important to note, the $1.29 price is the price that shopper 123456789 has considered to be favorable justifying an agreement to purchase a particular quantity of item 456789 over time. Of course the present invention does not require that shopper 123456789 pre-purchase a particular number of items to which an agreement is to pertain. To the contrary, by entering into an agreement, the present invention contemplates that the shopper will purchase the contracted or agreed to quantity of a particular item over time and will realize a price acceptable to the shopper each time that the shopper visits the subject store during the agreement effective period. The price that the shopper will realize for the particular item contemplated by a particular agreement, will usually be different than the ordinary shelf price of the item that is realized by a retailer.

It should be noted that while table 208 indicates dollar amounts in terms of U.S. dollars, the present invention is not so limited. To the contrary, the present invention contemplates the use of any form of currency. Moreover, while record R1 refers to a particular agreement that contemplates a particular price to be charged each time shopper 123456789 purchases item 456789, the present invention is not so restricted. To the contrary, the UNIT PRICE field or column could also be configured to store some other purchase trait that could be agreed to between a shopper and a store that maintains a POS controller and agreement management system. For example, such a purchase trait could indicate a function to take 10% off a shelf price between certain dates, or to provide a POS rebate of $1.00. And, in addition to discounts that may be realized against "then-current" prices that are charged by a retailer, table 208 could also store dollars-off values, rebate values, award or game points, or any other type of consideration that may be embodied within an agreement between two parties.

Record R2 has the same record format as record R1 and indicates similar information related to other products that frequent shopper 123456789 has agreed to purchase over time and at corresponding, specified prices. Accordingly, for purposes of brevity, a detailed discussion of record R2 is omitted.

Record R3, like records R1 and R2, has the same record format. However, for purposes of discussion and clarity, record R3 indicates a frequent shopper having an ID number of 123456790 who has agreed to buy 456795 between Oct. 2, 1997 and Jan. 1, 1998. That shopper has agreed to purchase item 456795 and receive a ten percent discount off of the "then-current" price that the store maintaining table 208 charges normally. In this fashion, a store could utilize the present invention, and in particular table 208, to provide an incentive program whereby the store would maintain price flexibility while offering incentives to buy to its customers at discounts over any established shelf price for a particular item.

The relationship of table 208 to other data processing systems and databases utilized in the present preferred embodiment will be clear from the discussions of the same that follow in regard to FIGS. 3B and 3C and the subsequent discussions in this section regarding FIGS. 4A, 4B, 5A, 5B, and 6. It is important to note, however, that the structure and arrangement of table 208, including its columns and fields, may change to suit particular design requirements. Many columns may be added to table 208 to carry out certain functionality and control within a data processing system employing a database table like table 208. Such additions and changes will be apparent to those skilled in the art.

Referring now to FIG. 3B, therein depicted is a database table for storing terms and conditions related to agreements that may be entered into between shoppers and a retail store maintaining such data. In particular, database base table 210 is a preferred implementation of AGREEMENT DATABASE 210 as illustrated in FIG. 2. Database table 210 (hereinafter "table 210") is maintained by system 102 (FIG. 1) and, in particular, in data storage sub-system 206 as illustrated in FIG. 2. Table 210 has a column and row arrangement, wherein columns form the fields and rows for the records. In particular, table 210 stores information about SUBSCRIPTION AGREEMENT IDENTIFIERs, ITEM NUMBERs, SUBSCRIPTION DURATIONs. SUBSCRIPTION QUANTITY(ies), UNIT PRICEs, and PENALTIES.

In table 210, record R1 has been marked with an asterisk next to its record identifier to indicate that it is related to other records in other tables and will be discussed in detail in the following paragraphs. Record R1 stores information related to an agreement that will require a shopper to purchase fifty items (i.e., an item having item number 456789) throughout a one year period. Accordingly, item number 456789 could refer to a gallon of milk, a grocery item, or any other item that a customer will purchase on a regular basis throughout a one year period. The price that a shopper will pay will be $1.29 each time the shopper purchases the item over time. There is no requirement that the shopper pre-pay or purchase all fifty units at the same time. The present invention allows POS acquisition of an agreed-upon price regardless of past buying history or the like. In exchange for a better price, the present invention requires the shopper to agree to purchase a certain quantity of a product over time.

If the shopper fails to purchase the agreed upon quantity of a particular product, the controller can cause a fine or penalty to be imposed on him. Such a fine or penalty may come in the form of a fee that is charged to the shopper via his credit card or the like. The column labeled PENALTY stores the associated penalty that may be imposed if a shopper fails to meet his obligations defined in table 210. In the case of record R1 if a shopper fails to purchase 52 items (i.e., item 456789) over a one year period, then a penalty of $25.00 may be imposed on the shopper by the store that maintains table 210. Such a $25.00 penalty may be charged to a credit card number maintained by the shopper as indicated in table 208.

Records R2 and R3 have the same record format as record R1. Accordingly, for purposes of brevity, a detailed discussion of records R2 and R3 is omitted.

Record R4, however, includes a penalty value indicating an important aspect of the present invention. That is, in record R4, the penalty value indicates "FCN: INC DIFF*ACTUAL VOLUME." That value is meant to indicate a "short-rate" function to be carried out by system 102 (FIG. 1) to impose a penalty on any customer that agrees to the terms and conditions and, in particular, the purchase commitment included in agreement 456792-4026 and who does not purchase 26 items over a one-year time period. More specifically, the value in the PENALTY field is intended to indicate that if a customer does not meet his purchasing commitment, then he will be assessed a penalty equal to the number of his actual purchases times (*) the difference (−) in cost between the retailer's normal shelf price and the agreement price. Accordingly, if the customer does not fulfill his purchasing obligation according to his agreement with the retailer, the customer will be charged an incremental amount for each item he purchased. Mathematically, the aforementioned type of function will yield a penalty that is illustrated as follows:

PENALTY=(# UNITS ACTUALLY PURCHASED (See FIG. 3A))×((NORMAL SHELF "UNIT" PRICE (See FIG. 3B)—AGREEMENT "UNIT" PRICE (See FIG. 3))

In the case of the above PENALTY, if a product's normal shelf price was $2.00 and its corresponding agreement price was $1.50, and a customer only purchased 25 units of a committed 50 units, the customer could be charged a penalty equal to $12.50 (i.e., (50 Units Obligated LESS 25 Units Purchased) TIMES (Normal Shelf Price LESS Agreement Price)).

The function specified in R4 illustrates that a mathematical or other operation may be specified as a penalty value. Any contractual penalty that suits particular design requirements may be employed. The use of functions and the implementation of operations to carry out such functions (e.g., mathematical operations) will be immediately understood by those skilled in the art of computer programming.

Although table 210 includes a PENALTY field or column that allows agreement-specific penalties to be designated and later applied to particular agreement breaches on the part of customers, the present invention also contemplates another preferred approach. In particular, it is also preferred that a system such as system 102 (FIG. 2) could execute a particular computer software program or programs to cause a particular penalty to be imposed. For example, a specific program could be configured to cause system 102 to impose a penalty in the form of a cost adjustment equal to an incremental amount over and above the agreed to price for a particular item or combination of items. Such a program and the aforementioned mathematical operations can easily be written in a computer language such as C++ by a programmer having ordinary skill in the art. In the case that a program is used to carry out a particular penalty and there is no need to have agreement specific penalties, there will be no need to include a PENALTY column in table 210.

The structure and arrangement of table 210, including its columns and fields may change to suit particular design requirements. Many columns may be added to table 210 to carry out certain functionality and control within a data processing system employing a database table like table 210. Such additions and changes will be apparent to those skilled in the art.

Referring now to FIG. 3C, therein depicted is a database table for storing information related to actual shoppers of the store that manages such information. In particular, database base table 212 is a preferred implementation of ACCOUNT DATABASE 212 as illustrated in FIG. 2. Database table 212 (hereinafter "table 212") is maintained by system 102 (FIG. 1) and, in particular, in data storage sub-system 206 as illustrated in FIG. 2. Table 212 has a column and row arrangement, wherein columns form the fields and rows for the records. In particular, table 212 stores information about FREQUENT SHOPPER ID NUMBERS, CUSTOMER NAMES, and CUSTOMER ADDRESSES.

In table 212, record R1 has been marked with an asterisk next to its record identifier to indicate that it is related to other records in other tables and will be discussed in detail in the following paragraphs. Record R1 stores information related to a frequent shopper having a FREQUENT SHOPPER ID NUMBER of 123456789. That shopper is named Bill Smith, having an address of 111 Red Street in Norwalk, Conn. 06850. Table 212 is related tables 300A and 300B by way of common field relationships. In particular, record R1 illustrates a relationship based upon FREQUENT SHOPPER ID NUMBER. In this way, table 212 allows a POS controller and agreement management system to record customer names and addresses related to customers that form agreements with the store that maintains the POS controller and agreement management system.

Records R2 and R3 have the same record format as record R1 and indicate similar information related to other customers that may utilize agreements to purchase particular items over time. Accordingly, for purposes of brevity, a detailed review and discussion of records R2 and R3 is omitted.

The structure and arrangement of table 212, including its columns and fields, may change to suit particular design requirements. Many columns may be added to table 212 to carry out certain functionality control within a data processing system employing a database table like table 212. Such additions and changes will be apparent to those skilled in the art.

The aforementioned discussions were concerned with the structural aspects of the preferred embodiments and corresponding components of the present invention. Accordingly, it should be understood that the POS controller and agreement management system shown in FIGS. 1 and 2 and the database tables illustrated in FIGS. 3A, 3B, and 3C have been designed to operate and function together. The flowcharts depicted in FIGS. 4A, 4B, 5A, 5B, and 6 and described below illustrate how such structures operate together. In particular, described below are the steps carried out by system 102 within a retailer to allow customers to enter into purchase agreements with merchants and to acquire items over time and at favorable terms.

Figure 4A:
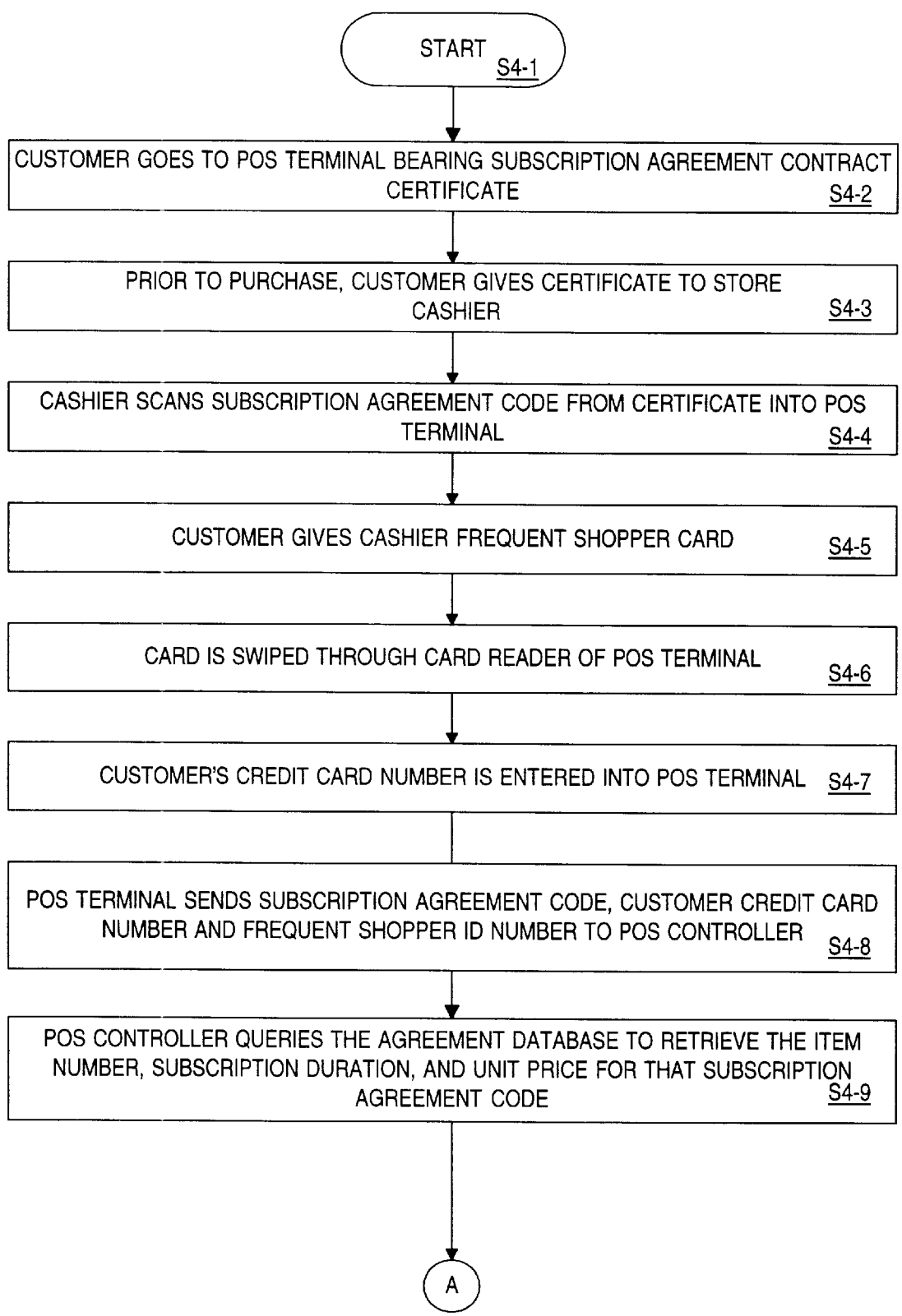
FIG. 4A is a flowchart that illustrates the operations carried out for establishing and managing a purchase agreement according to a preferred embodiment of the present invention.

With the aforementioned comments in mind, reference is now made to FIG. 4A. Depicted is a flowchart that illustrates the salient steps of a preferred process for allowing a shopper to enter into an agreement to purchase items from a merchant or other type retail establishment. It is important to note that many of the steps depicted in FIG. 4A illustrate the sequence of operations carried out by a data processing system or automatic computer/data processing controller such as system 102 as depicted in FIG. 1. The computer programming necessary to carry out many of the functions stated below will readily apparent to those skilled in the art of computer programming and will not require undue design and implementation effort. The flowcharts of FIGS. 4A, 4B, 5A, 5B, and 6 along with the discussions of the same found herein are sufficient and adequate to enable one skilled in the art of computer programming to make and use the present invention Processing starts at Step S4-1 and immediately proceeds to Step S4-2 where a customer approaches a point of sale terminal bearing a subscription agreement contract form or certificate. Such a certificate is shown in FIG. 7 and is discussed below.

Thereafter, processing proceeds to Step S4-3, where prior to purchase, the customer gives the certificate to a store cashier.

At Step S4-4, the cashier scans a subscription agreement code (preferably in barcode format) found on the certificate into the point of sale terminal. A discussion of the code is found below with regard to FIG. 7.

At Step S4-5, the customer gives the cashier a frequent shopper card indicating to the cashier and the store or merchant can determine whether the customer is a frequent shopper and whether he intends to enter into an agreement or subscription agreement arrangement. Such a situation will be evident when the customer presents his "frequent shopper" (not shown in the drawings) which identifies the customer (e.g., via a frequent shopper identifier or ID number) as a person with whom the store has or is about to do business.

At Step S4-6, the customer's frequent shopper card is swiped through a card reader of point of sale terminal to transfer a customer or frequent shopper ID number to the POS terminal. At Step S4-7, the customer's credit card number or other type of payment vehicle number such as a debit card number is entered into a point of sale terminal in a normal way. The POS controller stores the payment vehicle number to draw upon the account in the event that the customer does not fully honor his subscription agreement.

At Step S4-8, the POS terminal sends the subscription agreement code from the subscription agreement contract certificate, the customer credit card number and the customer ID number to the POS controller such as to POS controller and agreement system 102 (FIG. 1).

At Step S4-9, the POS controller and agreement management system queries its AGREEMENT DATABASE (FIG. 3B) to retrieve an appropriate item number, subscription duration and unit price that pertain to the subscription agreement code originally presented to the cashier and the POS terminal via the subscription agreement contract certificate presented by the customer at the point of sale.

Figure 4B:
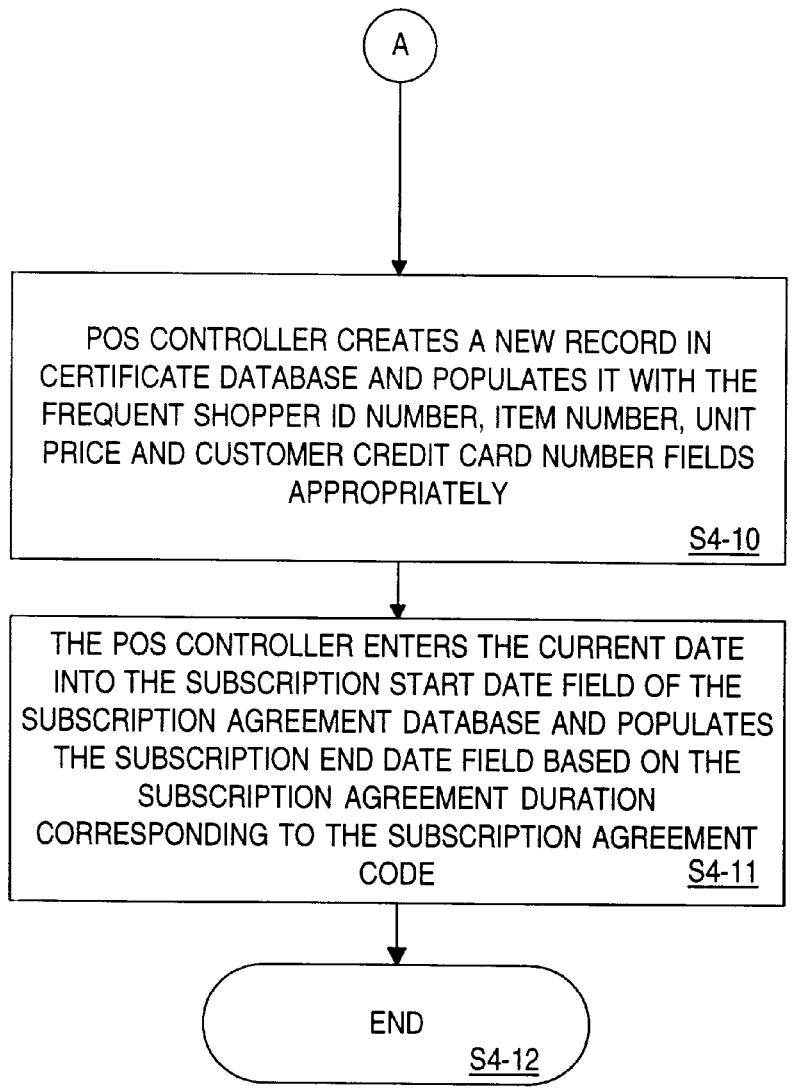
FIG. 4B is a flowchart that contains the conclusion of FIG. 4A.

Processing then proceeds to the top of FIG. 4B at Step S4-10.

At Step S4-10, the POS controller and agreement management system creates a new record in its CERTIFICATE DATABASE (FIG. 3A) and populates that record with the FREQUENT SHOPPER ID NUMBER, the item number, the unit price, and the customer credit card number fields appropriately and in accordance with the data retrieved from the AGREEMENT DATABASE (FIG. 3B). Accordingly, at this step, a specific purchase agreement has been formed between the customer and the store maintaining the POS controller.

The terms and conditions of the newly established agreement were retrieved from the AGREEMENT DATABASE (FIG. 3B) and were used to populate a new record in the CERTIFICATE DATABASE (FIG. 3A). That agreement is a purchase or subscription agreement that embodies and contemplates certain terms and conditions such as the product to purchase, the price to charge, the duration or term of the agreement and other information. Additionally, as noted above with regard to the discussion of FIG. 3B, a penalty may be recorded indicating the penalty that the customer may realize if he does not honor his purchasing obligations over time.

At Step S4-11, the POS controller and agreement management system enters the current date into the subscription start date field of the newly created record in the CERTIFICATE DATABASE (FIG. 3A) and populates the subscription and date field based on the subscription agreement duration corresponding to the subscription agreement code as retrieved from the AGREEMENT DATABASE (FIG. 3B).

Processing then ends at Step S4-12.

Accordingly, the operations carried out in FIGS. 4A and 4B illustrate the necessary steps that are carried out according to the present invention to allow a customer to enter into and form an agreement with a merchant to purchase a particular good over time and based on particular terms such as price and agreement duration.

Figure 5A:
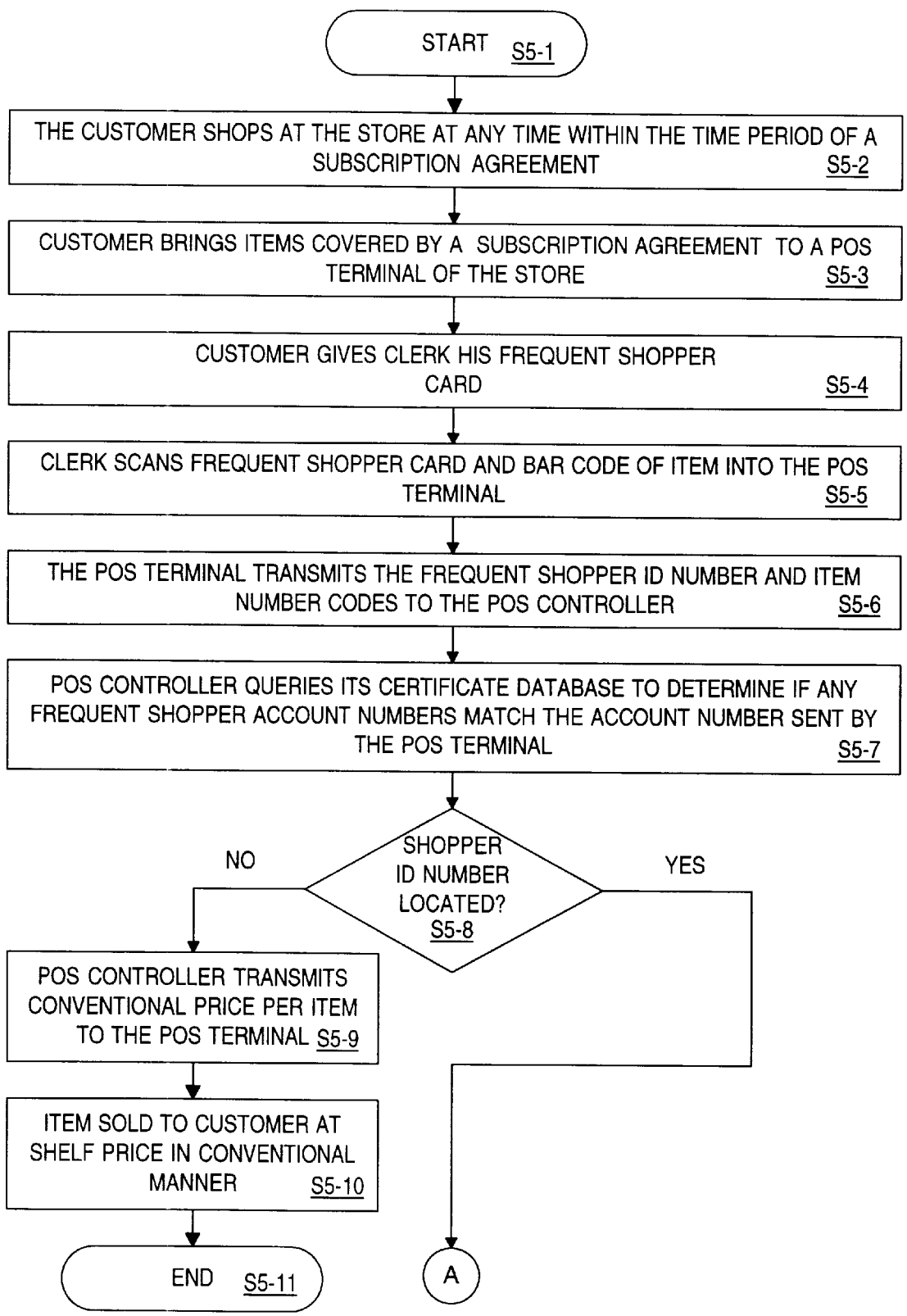
FIG. 5A is a flowchart that illustrates the operations carried out for processing a purchase transaction in accordance with a subscription purchase agreement according to a preferred embodiment of the present invention.
Figure 5B:
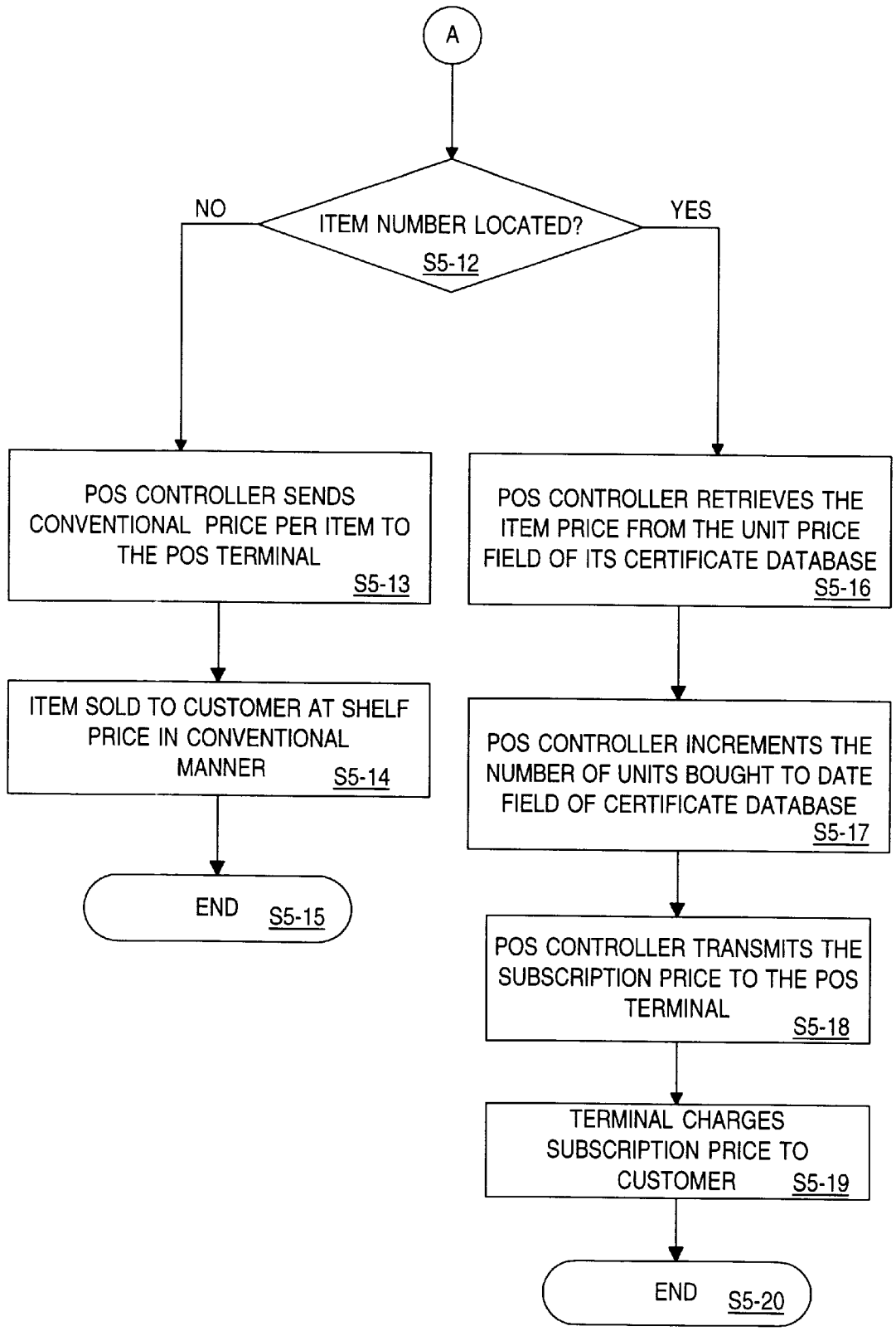
FIG. 5B is a flowchart that contains the conclusion of FIG. 5A.

Referring now to FIGS. 5A and 5B, therein depicted is a flowchart of a preferred approach for processing a customer's purchase between the customer and a retail merchandising establishment. Many of the steps depicted in FIGS. 5A and 5B illustrate the operations carried out by a data processing system such as the system 102 shown in FIG. 1. Computer programming necessary to carry out many of such functions will be readily apparent to those skilled in the art. Moreover, the flowchart of FIGS. 5A and 5B along with the discussions of the same found herein are sufficient and adequate to enable one skilled in the art of computer programming to make and use the present invention.

In particular, processing starts at Step S5-1 and immediately proceeds to S5-2 where the customer shops at a retailer at any time during the term of a subscription agreement involving the customer and the shop. Thereafter, the customer, at Step S5-3, brings an item that is covered by a subscription agreement to a POS terminal in the store.

Of course, it should be noted that that the customer may visit a web site, engage in electronic commerce, and have items delivered. The store could be an electronic mall or other online type entity supporting electronic commerce. The present invention does not require a customer to visit a store and the present invention is not limited to working within the confines of a single building. The example of a customer shopping at a merchant's facility is meant to illustrate the beneficial characteristics of the present invention and not meant to limit the scope of the same.

Accordingly, at Step S5-4, the customer notifies a sales a clerk of the customer's frequent shopper ID number (e.g., via a frequent shopper card) or other indication of a "subscription agreement" relationship with the retail merchandising establishment. And, at Step S5-5, the clerk can then scan the customer's frequent shopper card and a bar coded UPC code of an item to be purchased into a POS terminal.

At Step S5-6, the POS terminal then transmits the customer's frequent shopper identifier and the item's UPC code to a POS controller and agreement management system such as the one shown in FIG. 1.

At Steps S5-7 and S5-8, the POS controller and agreement management system queries its CERTIFICATE DATABASE (FIG. 3A) to determine if any frequent shopper account numbers match the customer's account number sent by the POS terminal. If there is no match, processing proceeds to Step S5-9. There, the POS controller and agreement management system transmits a conventional price for the item to the POS terminal. The conventional price may be the shelf price that the retail merchandising establishment normally charges for the item. In other words, a conventional price is one that represents a non-contracted for price.

Accordingly, the item will be sold to the customer at the shelf price in a conventional way via a conventional processing system at step S5-10.

As such, processing will end at Step S5-11.

If, at Step S5-8, the shopper ID number received from the frequent shopper ID card is found in the CERTIFICATE DATABASE (FIG. 3A), processing then proceeds to Step S5-12 at the top of FIG. 5B.

At Step S5-12, a determination is made as to whether the ITEM NUMBER is located in the CERTIFICATE DATABASE (FIG. 3A). If not, processing proceeds down a path beginning at Step S5-13.

At Step S5-13, the POS controller and agreement management system sends a conventional price for the item to the POS terminal. Thereafter, processing proceeds to Step S5-14, where the item is sold to the customer at a shelf price in a conventional way. And, processing ends at Step S5-15.

If, at Step S5-12, it is determined that the item does exist within the certificate's database, then processing proceeds to Step S5-16.

At Step S5-16, the POS controller retrieves the item price from the unit price field of the CERTIFICATE DATABASE (FIG. 3A). Thereafter, processing proceeds to Step S5-17 where the POS controller causes an increment to occur in the number of units bought field of the appropriate record in the CERTIFICATE DATABASE (FIG. 3A). Next, processing proceeds to Step S5-18, where the POS controller and agreement management system transmits the subscription price (i.e., the contracted-for price) to the POS terminal which may be displayed thereby.

At Step S5-19, the POS terminal causes a charge or a transaction to occur based upon the subscription price received from the POS CONTROLLER'S CERTIFICATE DATABASE (FIG. 3A). The customer, will receive his contracted-for price in this fashion. The present invention does not require that one payment mode be used. To the contrary, although credit cards are preferred, any form of payment may be used.

Processing ends at Step S5-20.

Figure 6A:
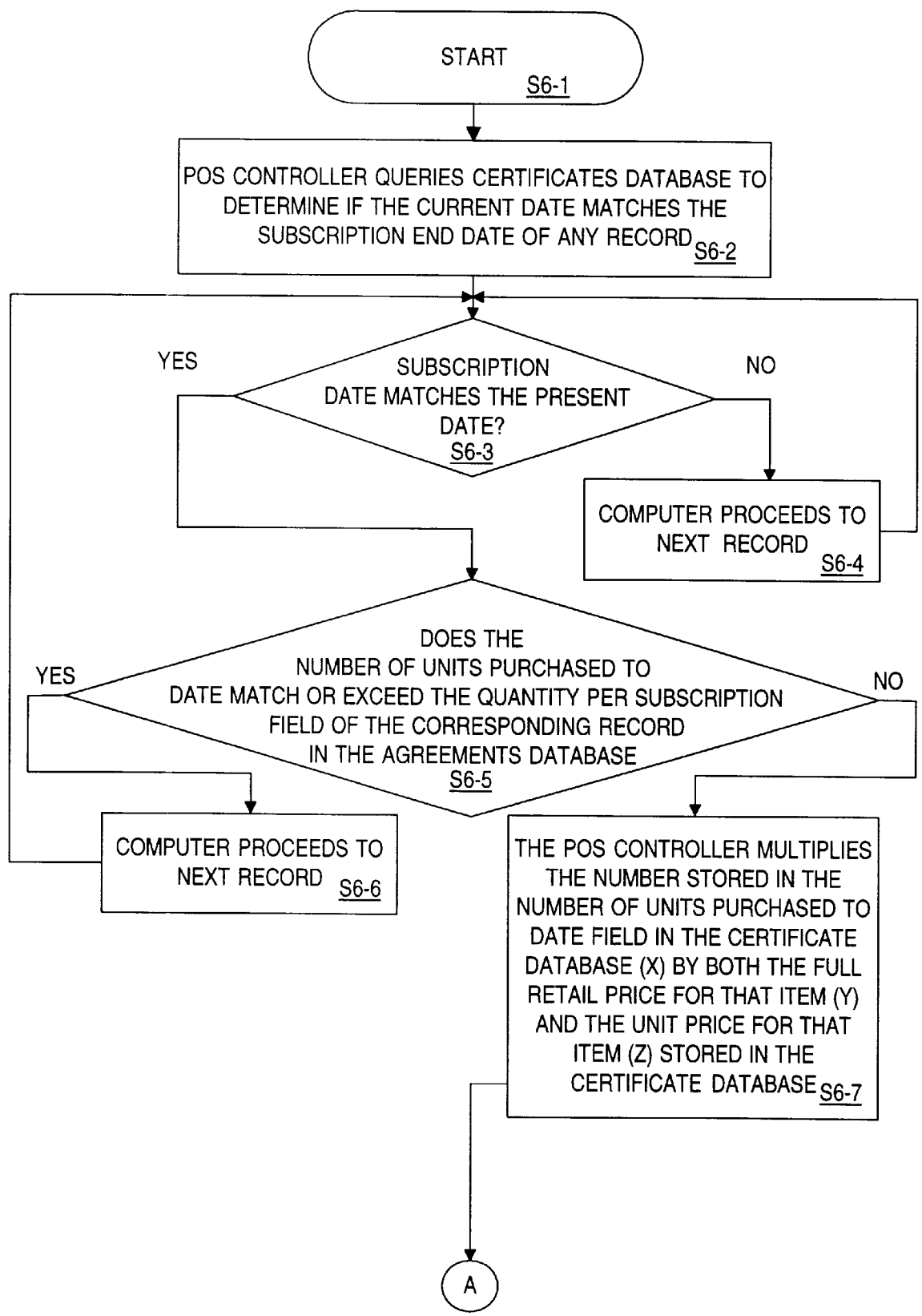
FIG. 6A is a flowchart that illustrates a subscription purchase agreement compliance check that is carried out by a POS controller according to a preferred embodiment of the present invention.
Figure 7:
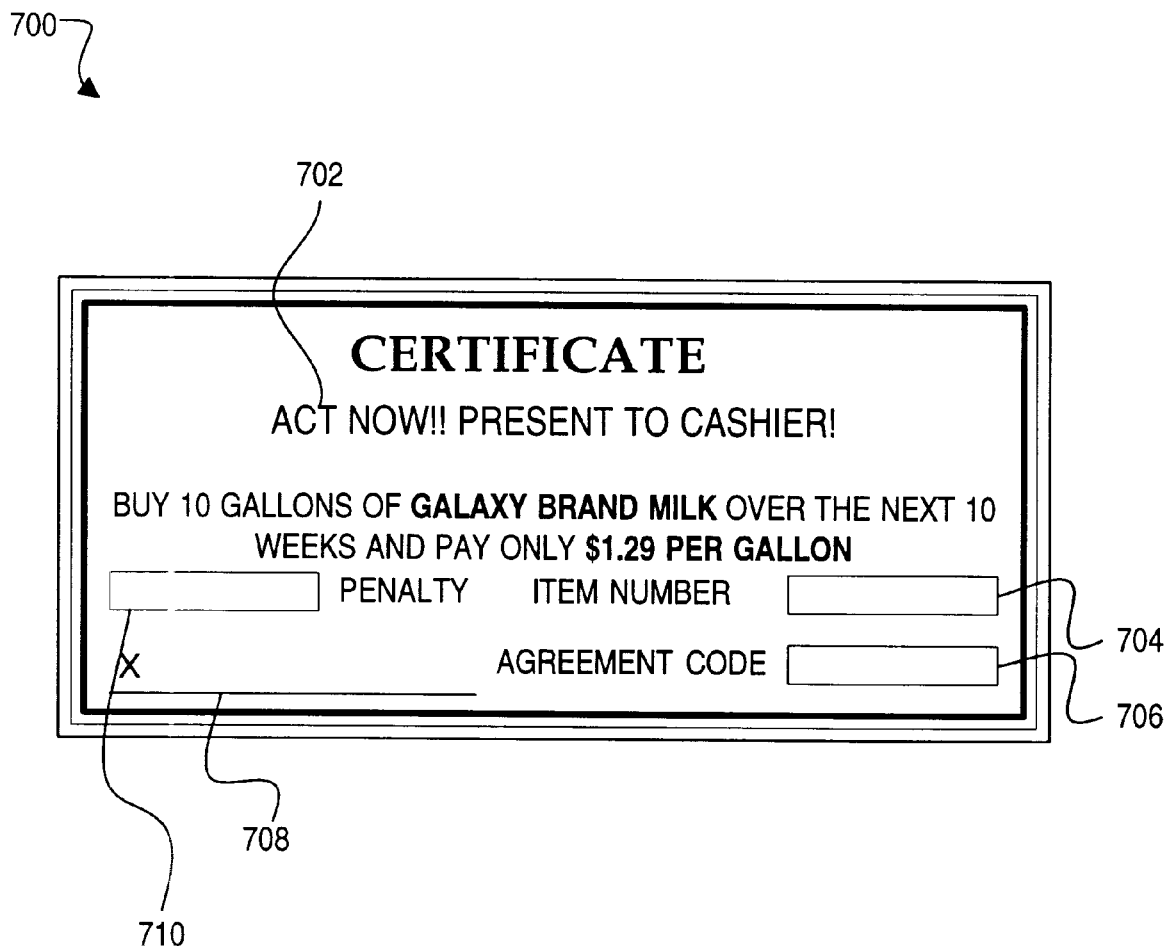
FIG. 7 is a diagram of an agreement offer certificate according to the present invention.

Referring now to FIG. 6A, therein depicted is a flowchart that illustrates the salient steps of a preferred process to be used by a POS controller and agreement management system to query its databases to determine if a shopper has fulfilled his subscription agreement obligations. Many of the steps depicted in FIG. 6A illustrate the sequence of operations carried out by a data processing system such as an automated or computer based data processing system maintained by a POS controller and agreement management system. Computer programming necessary to carry out many of the functions stated below will be readily apparent to those skilled in the art. The flowchart of FIG. 6A along with discussions of the same found herein are sufficient and adequate to enable one skilled in the art of computer programming to make and use the present invention.

The process depicted in FIG. 6A is utilized by a POS controller and agreement management system to locate active and/or expired agreements maintained therein. By locating records corresponding to expired agreements, a corresponding result of locating customers that may be charged a penalty for not adhering or fulfilling the obligations of their respective, previously arranged purchase agreements may also be located. In this way, the store can use the agreed to penalty and the customerÕs credit card number, or other payment vehicle number, to charge a customer who was negligent in fulfilling the obligations of a subscription agreement. Rather then charging a customer his penalty, the retailer can issue warnings or give a grace period to the customer to incent him to fulfill his agreement. The retailer can also offer the customer an option to let his currently expired and unfulfilled agreement roll over into a new agreement set by the retailer to incent a customer to continue shopping at the retailerÕs store.

Processing starts at Step S6-1 and immediately proceeds to Step S6-2, where the POS controller and agreement management system queries its CERTIFICATE DATABASE (FIG. 3A) to determine if the current date (i.e., the date upon which the process is executed) matches the subscription end date of any record maintained therein.

If, at Step S6-3, that determination is negative (e.g., no records were found), processing proceeds to Step S6-4 where a loop structure is executed to cause a record pointer to advance to a next record and where a branch back to the determination step of S6-3 is executed again. Although, the loop between the negative result of Step S6-3 and the record advancement step of Step S6-4 appears to be an endless loop, it will be readily understood by those skilled in the art that such a loop will in all likelihood include a branch counter or some other form of break instruction.

If, at Step S6-3, the subscription end date (of a record under review) matches the current date, processing proceeds to Step S6-5.

At Step S6-5, a determination is made as to whether the number of units purchased to date by a customer matches or exceeds the quantity specified in the subscription field of the corresponding and related record in the AGREEMENT DATABASE (FIG. 3B) (e.g., related via a common field or column among the two tables—common field: ITEM NUMBER). If not, processing proceeds to Step S6-7.

At Step S6-7, the POS controller and agreement management system sets out to determine a penalty to charge the appropriate customer for not having satisfied his obligations of the particular purchase agreement. Such a penalty may include a multiplication of the number of units purchased to date as specified in the CERTIFICATE DATABASE (FIG. 3A) by the full retail price or shelf, normally charged by the retailer for the particular item. For a discussion of such a penalty see the discussion of the same in regard to FIG. 3B above.

Figure 6B:
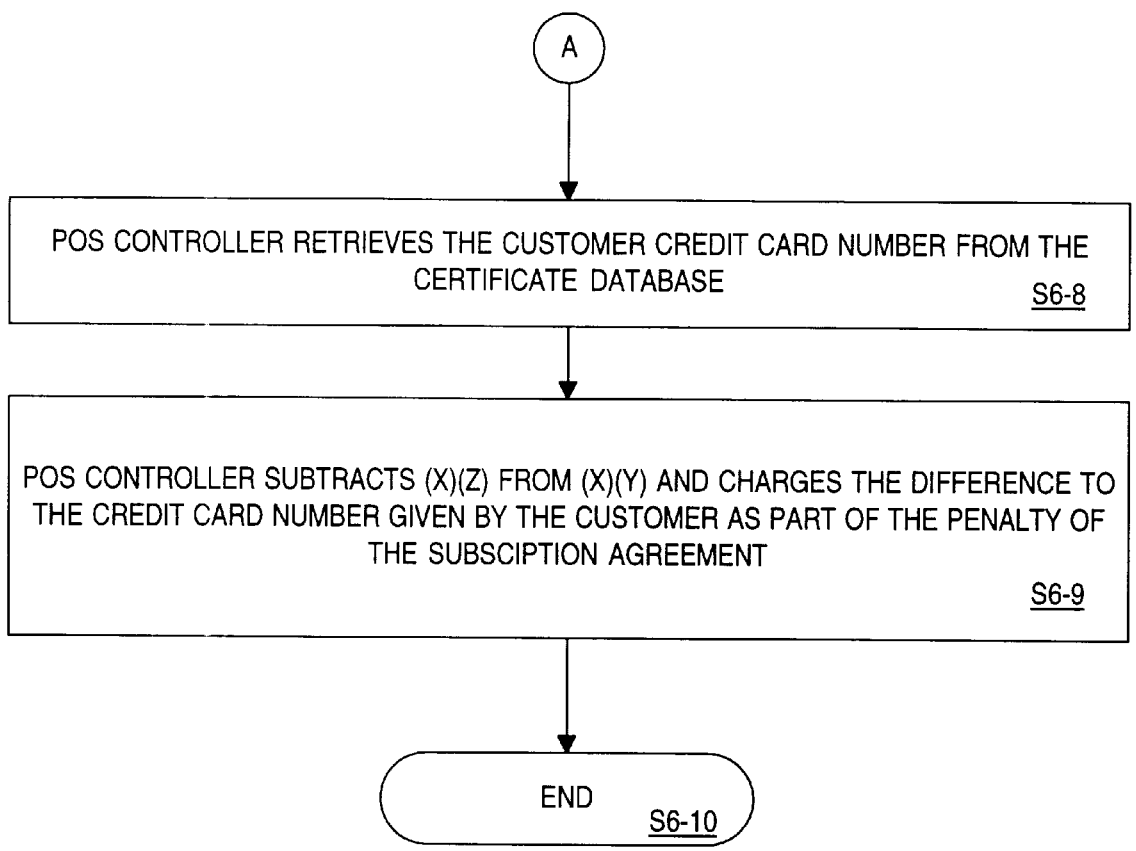
FIG. 6B is a flowchart that contains the conclusion of FIG. 6B.

Continuing on with FIG. 6B, at Step S6-8, the POS controller receives the customer credit card number from the CERTIFICATE DATABASE (FIG. 3A). And, at Step S6-9, the POS controller and agreement management system charges the penalty determined at Step S6-7 to the customer's credit card number in accordance with the appropriate agreement as a penalty under the terms of the previously arranged subscription agreement.

Processing then ends at Step S6-10.

If, at Step S6-5, the determination was affirmative, a loop back to Step S6-6 is executed to cause a next record (as advanced at Step S6-6) to be evaluated at Step S6-3. Although it appears that an endless loop could occur between Steps S6-6 and S6-3, in all likelihood there will be included within that process a branch or other form of break (e.g., break on file end). Such branches and breaks will be readily understood by those skilled in the art of computer programmming and database management design and implementation.

Referring now to FIG. 7, therein depicted is a certificate representing an offer to a customer to enter into a purchase agreement for the purchase of a particular item over a period of time on particular terms such as price. In particular, certificate 700 presents an offer 702 to a buyer to purchase 10 gallons of milk over a period time (e.g., a 10 week period). More particularly, certificate 700 includes the incentive to a customer to purchase ten gallons of Galaxy brand milk over a ten week period and whereby the customer will pay only $1.29 per gallon. The $1.29 price could represent a significant price savings over the store's normal shelf price. There is no requirement that the customer actually purchase all ten gallons at once or at any particular time during the ten week period of the agreement that is being proposed. It is required, however, that the customer receive the purchase price of $1.29 each time he comes to the store and seeks to purchase a gallon of Galaxy brand milk during the agreement term (e.g., 10 weeks).

Additionally, certificate 700 includes an item number 704 corresponding to a gallon of Galaxy brand milk. That item number may be in the form of a UPC or other bar code or may be a string of alpha and/or numeric characters that are to be scanned or keyed into a POS terminal. Accordingly, if item number 704 is indicative of a product family code (e.g., such as a product family code indicated in a UPC code), then certificate 700 can be used to establish an agreement for any brand of milk. As such, certificate 700 can allow agreements to be formed for specific products or for general product categories.

In any case, as the merchant may have many agreements being offered in relation to gallons of Galaxy brand milk, certificate 700 preferably bears an agreement code 706. Such an agreement code can be used to identify a database record that maintains the salient terms and conditions that correspond to certificate 700. For example, agreement code 706 can be used by system 102 (FIG. 1) to locate a record in an AGREEMENT DATABASE (FIG. 3B).

Certificate 700 also includes a penalty term indicator 710 indicating the type of penalty that could occur if the customer does not satisfy the obligations of the offer. That is, the penalty is designed to take effect when the customer does not meet his purchasing obligation requirements (e.g., he fails to purchase all agreed upon units of a particular product). The penalty indicator 710 should be conspicuous so as to clearly indicate the affect on the buyer if he does not purchase the required volume of items.

Additionally, certificate 700 includes signature block 708 for the purchaser to sign. Such blocks may or may not be used or needed, but are intended to be utilized in jurisdictions that require signatures to bind agreements.

Certificate 700 is preferably a paper form that is issued by a point of pickup unit in a retailer. Such a point of pickup unit may be one similar to automatic coupon dispensers commonly found in grocery stores. In this way, a customer can be offered to enter into multiple purchase agreements for particular items commonly found throughout a store. Of course, certificates could also be mailed or sent via other communication vehicles such as electronic mail and via the Internet to a particular customer. And, certificates or offers to enter into purchase agreements could even be printed on the backs of check-out receipts much like coupons are commonly delivered.

Accordingly, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for facilitating the sale of an item, comprising:
   a data storage system storing data about a buyer, an agreement between said buyer and a seller including a commitment by said buyer to purchase a specified plural of a item from said seller over a period of time and at a specified price; and
   a data processing system coupled to said data storage system and configured
   to receive from said buyer a request to purchase said item from said seller,
   to process said request by determining a purchase price for said item based on said specified price in said agreement,
   to output said purchase price, said purchase price forming the basis of a transaction involving said buyer and said item, and
   to charge a fee to an account maintained by said buyer if said buyer does not purchase said specified plurality of said item during said period of time.

2. The system according to claim 1, wherein said data about said buyer includes a buyer identifier.

3. The system according to claim 2, wherein said buyer identifier is a frequent shopper identifier.

4. The system according to claim 2, wherein said buyer identifier is a credit card number.

5. The system according to claim 2, wherein said buyer identifier is a debit card number.

6. The system according to claim 1, wherein said request is made at a point of sale terminal.

7. The system according to claim 1, wherein said request is a made via a network, said network coupling said buyer to said data processing system.

8. The system according to claim 7, wherein said network is the Internet.

9. The system according to claim 1, wherein said fee includes a price adjustment based on said purchase price, said price adjustment being charged to an account maintained by said buyer, said account having all account identifier, said account identifier being stored by said seller.

10. The system according to claim 1, wherein said specified price is different from a regular price, said regular price normally being realized by said seller in the absence of a purchase agreement like said agreement.

11. The system according to claim 1, wherein said specified price includes a percentage discount amount to be deducted from a regular price that said seller normally realizes for said item.

12. The system according to claim 1, wherein said data storage system and said data processing system are maintained by a retailer.

13. The system according to claim 1, wherein said data processing further includes a point of sale terminal, said point of sale terminal configured to manifest said purchase price.

14. The system according to claim 1, wherein said data processing system is further configured to update said data in accordance with said request from said buyer.

15. The system according to claim 14, wherein said data processing system updates said data by incrementing a counter each time said buyer purchases said item from said seller.

16. A system for facilitating the sale of a product, comprising:

a data storage system storing data about a buyer, a subscription purchase agreement between said buyer and a seller including a commitment on the part of said buyer to purchase a specified plurality of a product from said seller over a period of time and at a specified price, and a record including information related to said buyer and said subscription purchase agreement; and a data processing system operatively coupled to said data storage system and configured to receive from said buyer a request to purchase said product from said seller, to process said request by querying said data storage system to determine a purchase price for said product based on said specified price in said agreement and updating said record in accordance with said request, to output said purchase price, said purchase price forming the basis of a transaction involving said buyer, said seller, and said product, and to charge a fee to an account maintained by said buyer if said buyer does not purchase said specified plurality of said product during said period of time.

17. The system according to claim 16, wherein said data about said buyer includes a buyer identifier.

18. The system according to claim 17, wherein said buyer identifier is a frequent shopper identifier.

19. The system according to claim 17, wherein said buyer identifier is a credit card number.

20. The system according to claim 17, wherein said buyer identifier is a debit card number.

21. The system according to claim 16, wherein said request is made by a point of sale terminal.

22. The system according to claim 16, wherein said request is a made via a network, said network coupling said buyer to said data processing system.

23. The system according to claim 16, wherein said fee includes a price adjustment based on said purchase price, said price adjustment being charged to an account maintained by said buyer.

24. The system according to claim 16, wherein said specified price is different from a regular price, said regular price normally being realized by said seller in the absence of a purchase agreement like said agreement.

25. The system according to claim 16, wherein said specified price includes a percentage discount amount to be deducted from a regular price that said seller normally realizes for said product.

26. The system according to claim 16, wherein said data storage system and said data processing system are maintained by a retailer.

27. The system according to claim 26, wherein said data processing further includes a point of sale terminal, said point of sale terminal configured to manifest said purchase price.

28. A system for facilitating the sale of a product, comprising:

a data storage system;

a data processing system coupled to said data storage system and operative to receive from a buyer a request to enter into an agreement with a seller, said agreement including a commitment by said buyer to purchase a specified plurality of an item from said seller over a specified period of time and at a specified price, to process said request by storing data in said data storage system, said data relating to said buyer, said agreement, a fee to charge to an account maintained by said buyer if said buyer does not purchase said specified plurality of said item during said period of time, and a counter indicating a number of times that said buyer purchases said item from said seller.

29. The system according to claim 28, wherein said data relating to said buyer includes a buyer identifier.

30. The system according to claim 29, wherein said buyer identifier is a frequent shopper identifier.

31. The system according to claim 29, wherein said buyer identifier is a credit card number.

32. The system according to claim 29, wherein said buyer identifier is a debit card number.

33. The system according to claim 28, wherein said request is made at a point of sale terminal maintained by said seller.

34. The system according to claim 28, wherein said request is a made via a network, said network coupling said buyer to said data processing system.

35. The system according to claim 28, wherein said fee includes a price adjustment based on said purchase price, said price adjustment being charged to an account maintained by said buyer.

36. The system according to claim 28, wherein said specified price is different from a regular price, said regular price normally being realized by said seller in the absence of a purchase agreement like said agreement.

37. The system according to claim 28, wherein said specified price includes a percentage discount amount to be deducted from a regular price that said seller normally realizes for said item.

38. The system according to claim 28, wherein said data storage system and said data processing system are maintained by a retail establishment.

39. The system according to claim 28, wherein said data processing system further includes a point of sale terminal, said point of sale terminal configured to manifest said purchase price.

40. The system according to claim 28, wherein said data processing system is further operative to increment said counter each time said buyer purchases said item from said seller.

41. The system according to claim 28, wherein said item is a product offered by said seller.

42. The system according to claim 28, wherein said item is a service offered by said seller.

43. A point of sale processing system, comprising:
a data storage system configured to store data about a buyer, a subscription purchase agreement between said buyer and a seller including a commitment by said buyer to purchase a specified plurality of a product from said seller over a period of time and at a specified price, and a record including information related to said buyer and said subscription purchase agreement; and
a data processing system configured
to be operatively coupled to said data storage system,
to receive from said buyer a request to purchase said product from said seller,
to process said request by querying said data storage system to determine a purchase price for said product based on said specified price in said agreement and updating said record in accordance with said request,
to output sad purchase price, said purchase price forming the basis of a transaction involving said buyer, said seller, and said product, and
to charge a fee to an account maintained by said buyer if said buyer does not purchase said specified plurality of said product during said period of time.

44. The system according to claim 43, wherein said data about said buyer includes a buyer identifier.

45. The system according to claim 44, wherein said buyer identifier is a frequent shopper identifier.

46. The system according to claim 44, wherein said buyer identifier is a credit card number.

47. The system according to claim 44, wherein said buyer identifier is a debit card number.

48. The system according to claim 43, wherein said request is made by a point of sale terminal coupled to said data processing system.

49. The system according to claim 43, wherein said request is a made via a network, said network coupling said buyer to said data processing system.

50. The system according to claim 49, wherein said network is the Internet.

51. The system according to claim 43, wherein said fee includes a price adjustment based on said purchase price, said price adjustment being charged to an account maintained by said buyer.

52. The system according to claim 43, wherein said specified price is different from a regular price, said regular price normally being realized by said seller in the absence of a purchase agreement like said subscription purchase agreement.

53. The system according to claim 52, wherein said specified price includes a percentage discount amount to be deducted from a regular price that said seller normally realizes for said product.

54. The system according to claim 43, wherein said data storage system and said data processing system are configured to be maintained by a retailer.

55. The system according to claim 54, wherein said data processing system further includes a point of sale terminal, said point of sale terminal configured to manifest said purchase price.

56. A process for facilitating the sale of an item, comprising the steps of:
storing in a data storage system data about a buyer, an agreement between said buyer and a seller including a commitment by said buyer to purchase a specified plurality of an item from said seller over a period of time and at a specified price;
receiving from said buyer a request to purchase said item from said seller;
processing in a data processing system said request by determining a purchase price for said item based on said specified price in said agreement;
updating said data in accordance with said request;
outputting said purchase price, said purchase price forming the basis of a transaction involving said buyer and said product; and
charging a fee to an account maintained by said buyer if said buyer does not purchase said specified plurality of said item during said period of time.

57. The process according to claim 56, wherein said data about said buyer includes a buyer identifier.

58. The process according to claim 57, wherein said buyer identifier is a frequent shopper identifier.

59. The process according to claim 57, wherein said buyer identifier is a credit card number.

60. The process according to claim 57, wherein said buyer identifier is a debit card number.

61. The process according to claim 56, wherein said request is made at a point of sale terminal.

62. The process according to claim 56, wherein said fee includes a price adjustment based on said purchase price, said price adjustment being charged to an account maintained by said buyer.

63. The process according to claim 56, wherein said specified price is different from a regular price, said regular price normally being realized by said seller in the absence of a purchase agreement like said agreement.

64. The process according to claim 56, wherein said specified price includes a percentage discount amount to be deducted from a regular price that said seller normally realizes for said item.

65. The process according to claim 56, further comprising the step of incrementing a counter maintained in said record each time said buyer purchases said item from said seller.

66. A process for facilitating the sale of an item, comprising the steps of:
maintaining in a data storage system data about a buyer, a subscription purchase agreement between said buyer and a seller including a commitment by said buyer to purchase a specified plurality of an item from said seller over a period of time and at a specified price, and a record including information related to said buyer and said subscription purchase agreement;
receiving from said buyer a request to purchase said item from said seller;
processing in a data processing system said request by determining a purchase price for said item based on said specified price in said subscription purchase agreement; and
updating said record in accordance with said request;
outputting said purchase price, said purchase price forming the basis of a transaction involving said buyer and said product; and
charging a fee to an account maintained by said buyer if said buyer does not purchase said specified plurality of said item during said period of time.

67. The process according to claim 66, wherein said data about said buyer includes a buyer identifier.

68. The process according to claim 67, wherein said buyer identifier is a frequent shopper identifier.

69. The process according to claim 67, wherein said buyer identifier is a credit card number.

70. The process according to claim 67, wherein said buyer identifier is a debit card number.

71. The process according to claim 66, wherein said request is made at a point of sale terminal.

72. The process according to claim 66, wherein said request is a made via a network.

73. The process according to claim 72, wherein said network is the Internet.

74. The process according to claim 66, wherein said fee includes a price adjustment based on said purchase price, said price adjustment being charged to an account maintained by said buyer.

75. The process according to claim 66, wherein said specified price is different from a regular price, said regular price normally being realized by said seller in the absence of a purchase agreement like said agreement.

76. The process according to claim 66, wherein said specified price includes a percentage discount amount to be deducted from a regular price that said seller normally realizes for said item.

77. The process according to claim 66, further comprising the step of incrementing a counter maintained in said record each time said buyer purchases said item from said seller.

78. A process for facilitating the sale of a product, comprising the steps of:
receiving a request from a buyer to enter into an agreement with a seller, said agreement including a commitment by said buyer to purchase a specified plurality of an item from said seller over a period of time and at a specified price;
processing said request by establishing a record in a data storage system, said record configured to maintain data relating to said buyer, said agreement, a fee to be charged to an account maintained by said buyer if said buyer does not purchase said specified plurality of said item during said period of time, and a counter indicating a number of times that said buyer purchases said item from said seller.

79. The process according to claim 78, wherein said request is made at a point of sale terminal maintained by said seller.

80. The process according to claim 78, wherein said fee includes a price adjustment based on said purchase price, said price adjustment being charged to an account maintained by said buyer.

81. The process according to claim 78, wherein said specified price is different from a regular price, said regular price normally being realized by said seller in the absence of a purchase agreement like said agreement.

82. The process according to claim 78, wherein said specified price includes a percentage discount amount to be deducted from a regular price that said seller normally realizes for said item.

83. The process according to claim 78, further comprising a step of incrementing said counter by one each time said buyer purchases said item from said seller.

84. A system for facilitating the sale of an item, comprising:
a data storage system maintaining data about a buyer, an agreement between said buyer and a seller including a commitment by said buyer to purchase a specified plurality of an item from said seller over a period of time, and a record including information related to said buyer and said agreement; and
a data processing system coupled to said data storage system and configured
to receive from said buyer a request to purchase said item from said seller,
to process said request by determining a purchase trait related to said item based on said agreement and updating said record in accordance with said request, to output said purchase trait, said purchase trait forming the basis of a transaction involving said buyer and said item; and
to charge a fee to an account maintained by said buyer if said buyer does not purchase said specified plurality of said item during said period of time.

85. The system according to claim 84, wherein said data about said buyer includes a buyer identifier.

86. The system according to claim 85, wherein said buyer identifier is a frequent shopper identifier.

87. The system according to claim 85, wherein said buyer identifier is a credit card number.

88. The system according to claim 85, wherein said buyer identifier is a debit card number.

89. The system according to claim 84, wherein said request is made at a point of sale terminal.

90. The system according to claim 84, wherein said fee includes a price adjustment based on said purchase trait, said price adjustment being charged to an account maintained by said buyer.

91. The system according to claim 84, wherein said data storage system and said data processing system are maintained by a retailer.

92. The system according to claim 84, wherein said data processing further includes a point of sale terminal, said point of sale terminal configured to manifest said purchase price.

93. The system according to claim 84, wherein said data processing system updates said record by incrementing a counter each time said buyer purchases said item from said seller.

94. The system according to claim 84, wherein said item is a product offered by said seller.

95. The system according to claim 84, wherein said item is a service offered by said seller.

96. The system according to claim 84, wherein said purchase trait is a percentage discount to be applied to a purchase price that said seller normally charges for said item.

97. The system according to claim 84, wherein said purchase trait is a cost reduction amount to be applied to a purchase price that said seller normally charges for said item.

98. A method of facilitating the sale of an item, comprising the steps of:
storing in a data storage system a table including data identifying a buyer, data identifying a product, and data identifying an agreement between said buyer and a seller including a commitment by said buyer to purchase a specified plurality of said product from said seller within a specified period of time at a specified purchase price per product;
receiving a request to purchase said product including said data identifying said buyer and said data identifying said product;
processing in a data processing system said data identifying said buyer and said data identifying said product to identify said specified purchase price in said table; and
outputting said specified purchase price.

99. The method of claim 98 and further including the step of receiving data indicating a sale of said product to said buyer at said specified purchase price.

100. The method of claim 99 and further including the step of modifying said data identifying said agreement to indicate said sale of said product.

101. The method of claim 98 and further including the step of penalizing said buyer for failing to purchase said plurality of products in said specified period of time.

102. The method of claim 101 wherein said step of penalizing said buyer includes charging a fee to a buyer account.

103. The method of claim 98 wherein the data identifying a buyer comprises a frequent shopper identifier.

104. The method of claim 98 wherein the data identifying a product comprises a UPC code.

105. The method of claim 98 wherein said step of processing said data includes using said data identifying said buyer and said data identifying said product to retrieve said specified purchase price from said table.

106. The method of claim 98 wherein said step of outputting said specified purchase price includes adding said specified purchase price to a transaction total.

107. A system for facilitating the sale of an item, comprising:
- a data storage system storing a table including data identifying a buyer, data identifying a product, and data identifying an agreement between said buyer and a seller including a commitment by said buyer to purchase a plurality of said product from said seller within a specified period of time at a specified purchase price per product;
- a data processing system connected to said data storage system and operative to:
    receive a request to purchase said product including said data identifying said buyer and said data identifying said product,
    process said data identifying said buyer and said data identifying said product to identify said specified purchase price in said table, and
    output said specified purchase price.

108. The system of claim 107 wherein said data processing system is further operative to receive data indicating a sale of said product to said buyer at said specified purchase price.

109. The system of claim 108 wherein said data processing system is further operative to modify said data identifying said agreement to indicate said sale of said product.

110. The system of claim 107 wherein said data processing system is further operative to penalize said buyer for failing to purchase said plurality of products in said specified period of time.

111. The system of claim 110 wherein said operation of penalizing said buyer includes charging a fee to a buyer account.

112. The system of claim 107 wherein the data identifying a buyer comprises a frequent shopper identifier.

113. The system of claim 107 wherein the data identifying a product comprises a UPC code.

114. The system of claim 107 wherein said operation of processing said data includes using said data identifying said buyer and said data identifying said product to retrieve said specified purchase price from said table.

115. The system of claim 107 wherein said operation of outputting said specified purchase price includes adding said specified purchase price to a transaction total.

* * * * *